United States Patent [19]

Rachais

[11] 4,159,150
[45] Jun. 26, 1979

[54] FEEDING AND DISCHARGING APPARATUS FOR AN INSTALLATION UNDER SUBATMOSPHERIC PRESSURE

[75] Inventor: Claude Rachais, Paris, France
[73] Assignee: Creusot-Loire, Paris, France
[21] Appl. No.: 863,842
[22] Filed: Dec. 23, 1977
[30] Foreign Application Priority Data
Feb. 17, 1977 [FR] France .................. 77 04471
[51] Int. Cl.² .............................................. B65G 53/24
[52] U.S. Cl. ...................................... 406/75; 406/124
[58] Field of Search .................... 302/21, 23, 26, 27, 302/28, 42, 52, 11

[56] References Cited
U.S. PATENT DOCUMENTS

| 3,307,646 | 3/1967 | Hage | 302/23 X |
| 3,424,501 | 1/1969 | Young | 302/21 |

FOREIGN PATENT DOCUMENTS 425841 10/1974 U.S.S.R. .................... 302/23

Primary Examiner—Robert B. Reeves
Assistant Examiner—James L. Rowland
Attorney, Agent, or Firm—Haseltine, Lake & Waters

[57] ABSTRACT

A feeding and discharging apparatus for continuously feeding particulate material to and continuously discharging material from a chamber formed of a machine at subatmospheric pressure, e.g. a vacuum jet mill. The apparatus employs a feeding device for feeding particulate material, a discharging device for discharging particulate material, at least two feeding chambers, each having an inlet connected to the feeding device and an outlet for connection to said chamber. A valve structure is provided for closing the feeding chambers. At least two discharging chambers are provided each having an inlet for connection to the chamber formed of the machine and an outlet connected to said discharging device, a valve assembly is provided for closing the discharging chambers, each of the feeding and discharging chambers comprising a compartment for storing the material, and a pressurizing structure for producing a subatmospheric pressure in each compartment.

4 Claims, 1 Drawing Figure

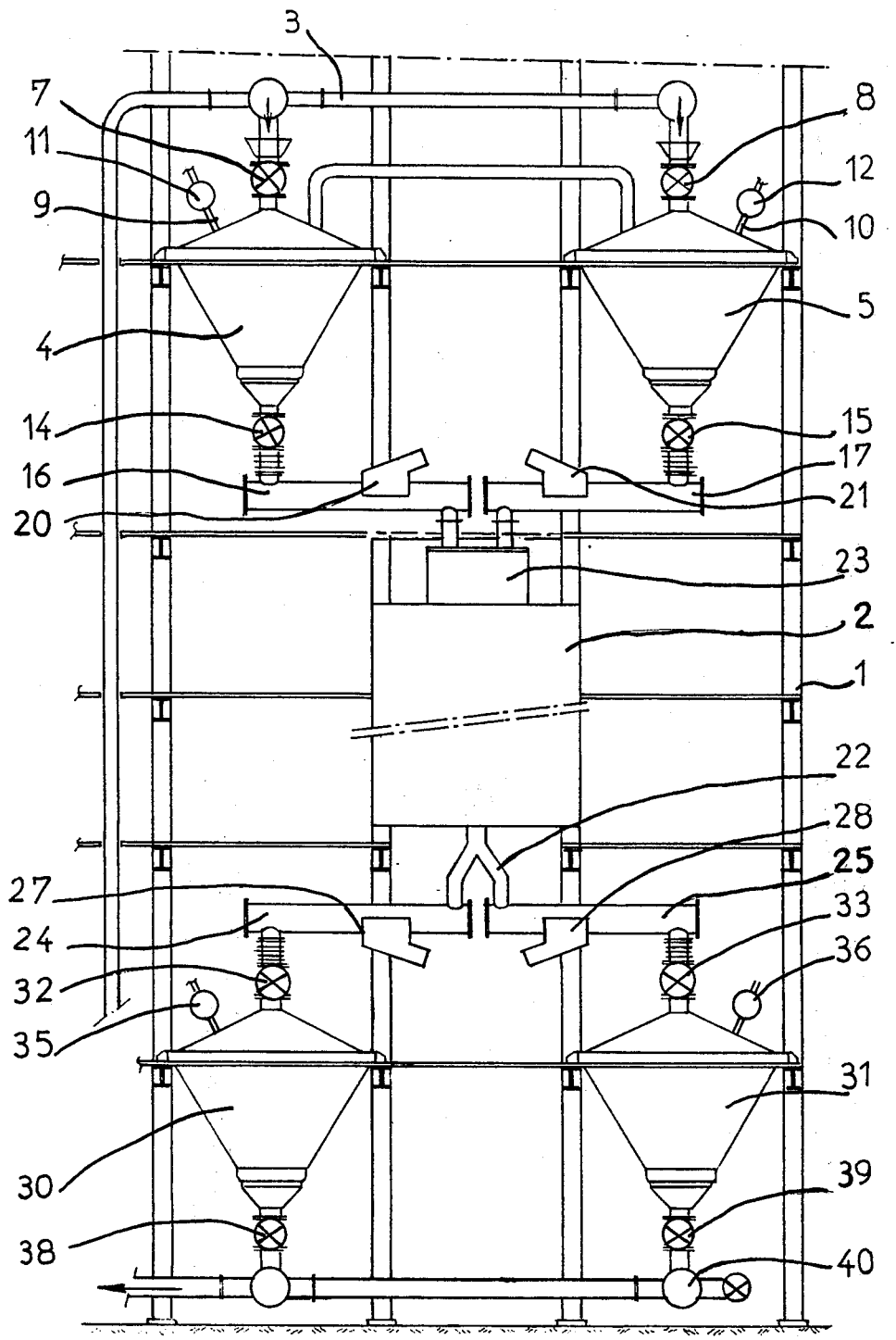

FEEDING AND DISCHARGING APPARATUS FOR AN INSTALLATION UNDER SUBATMOSPHERIC PRESSURE

BACKGROUND OF INVENTION

The invention relates to a feeding and discharging apparatus for an installation under subatmospheric pressure, which enables particulate material, e.g. in the form of grains or powder, to pass continuously through the installation.

When an installation for the treatment of a solid material, in the form of grains or powder, is intended to operate under vacuum, it is very difficult to continuously feed the installation with material to be treated, and to discharge the material resulting from the treatment, it not being possible for the material to be supplied directly under leaktight conditions from the outside into the installation under vacuum, and from the installation under vacuum to the outside.

In particular, a vacuum jet mill is known, the performance of which is very superior to that of conventional mills which can be used for grinding clinker, and which has not hitherto been employed industrially for various reasons, inter alia because it was not possible to ensure the continuous operation of the mill for long periods.

One of the major difficulties in ensuring the continuous operation of the jet mill lies in its feeding with the material to be ground and in the discharging of the ground material, which operations must be carried out into and out of an enclosure under vacuum. Solely discontinuous systems have therefore been used hitherto, the material being stored in a buffer compartment at the start of the operation and collected in another buffer compartment during the operation, these compartments being situated inside the enclosure under vacuum. This method of operation obviously prohibits the industrial use of the vacuum mill.

SUMMARY OF INVENTION

According to the present invention there is provided a feeding and discharging apparatus for continuously feeding particulate material to and continuously discharging material from an installation under subatmospheric pressure, said apparatus comprising a feeding device for feeding particulate material, a discharging device for discharging particulate material, at least two feeding chambers, each having an inlet connected to said feeding device and an outlet for connection to said installation, valve means for closing said feeding chambers, at least two discharging chambers, each having an inlet for connection to said installation and an outlet connected to said discharging device, valve means for closing said discharging chambers, each of said feeding and discharging chambers comprising a compartment for storing the material, and means for producing a subatmospheric pressure in each said compartment.

In order that the invention shall be fully understood, an embodiment thereof for use in association with a vacuum jet clinker mill will now be described, by way of example only, with reference to the accompanying drawing.

IN THE DRAWINGS

In the drawing the single FIGURE shows a view in elevation of the embodiment of a feeding and discharging apparatus including the evacuated enclosure which houses a jet clinker mill.

DESCRIPTION OF INVENTION

All the components forming the feeding and discharging apparatus and the evacuated enclosure which contains the mill are situated vertically in a large framework 1.

The enclosure 2 of the mill, as well as the pumps and filters for evacuating this enclosure are in the central part of the framework.

In the upper part of the installation, a feeding circuit 3 is provided for supplying the granulated material as a suspension in a stream of air to two feeding chambers 4 and 5, the upper parts of which are connected to the feeding circuit 3 through valves 7 and 8.

The feeding chambers are in the shape of double frustocones, the upper frustocone forming a hood of the chamber and the lower frustocone forming a hopper into which the granulated material flows. Pipes 9 and 10 connected to the feeding chambers are connected to vacuum pumps 11 and 12 for evacuating the insides of the chambers when the valves 7 and 8 are closed. The lower frustocones forming the hoppers of the chambers 4 and 5 are connected to chutes 16 and 17 through valves 14 and 15 for isolating the chambers from the chutes.

Each of the chambers 4, 5 can therefore be isolated from the feeding circuit 3 and from the chutes 16 and 17, the inlets and outlets of the chambers being provided with the valves 7, 8, 14 and 15 which are impervious to the re-entry of air and which consist of deformable pipes capable of being opened or closed by clamps.

The chutes 16 and 17 consist of leaktight tubes and are associated with vibrators 20 and 21 which assist the flow of the material when the tubes are set in vibration.

The outlet ends of the chutes 16 and 17 are connected to the inside of the leaktight enclosure 2 through a distributor 23 which supplies the granulated material to the mill rotor.

The ground product collected at the base of the enclosure 2 flows into a branched pipe 22 and towards chutes 24 and 25 which are identical to the chutes 16 and 17 and are provided with vibrators 27 and 28.

The outlets of the chutes 24 and 25 are connected to discharging chambers 30 and 31 through two valves 32 and 33 which are identical to the valves with which the feeding chambers are equipped.

The upper parts of the chambers 30 and 31, which are identical to the upper parts of the chambers 4 and 5, are connected to evacuating devices 35 and 36.

The lower parts of the chambers 30 and 31 are connected to a discharging circuit 40 for transport of the ground material pneumatically. Valves 38 and 39, which are situated between the outlets of the chambers 30 and 31 and the discharging circuit, enable isolation of the chambers 30 and 31 from the discharging circuit 40 under leaktight conditions.

The vibrating chutes 16, 17 and 24, 25 are connected to the valves, connecting them to the chambers 4, 5, 30, 31 and to the evacuated enclosure by means of flexible junctions whereby the vibrations are absorbed. These junctions can be, for example, of the bellows type.

The operation of the installation will now be described for the case of grinding grains of cement clinker using a vacuum mill situated inside the evacuated enclosure 2.

Clinker in granular form is supplied continuously by the feeding circuit 3 to one of the two chambers 4 and 5, for example to the chamber 4 which is isolated from the vibrating chute 16 by closing valve 14. Valve 7 is open and the valve 8 is closed.

While chamber 4 is being filled, cement clinker flows continuously into the chute 17 from chamber 5, valve 15 being open. The chute 17, set in vibration by the vibrator 21, conveys the clinker uniformly to the distributor 23 which introduces the clinker into the mill rotor. The feeding rate of the circuit 3 and the speed of flow of the material through the chute 17 are set so that the chamber 4 can be filled in only a fraction of the time taken to empty the chamber 5; for example, chamber 4 can be filled in half the time taken for all the granulated material in the chamber 5 to flow out.

When the chamber 4 has been filled, the feeding by the pneumatic circuit 3 is interrupted, and the valve 7 is closed, to completely isolate the chamber 4 from the outside and from the evacuated enclosure. The vacuum pump 11 is then put into operation, and the storage compartment of the chamber 4 is evacuated until a residual pressure is obtained which is comparable to that prevailing in the evacuated enclosure 2.

During these evacuation operations, the upper level of the granulated product contained in the chamber 5 has reached virtually the base of this chamber, and the necessary operations must then be carried out to prepare the chamber 4 for the feeding operation and to prepare the chamber 5 for filling. In order to do this, valve 15 is closed and valve 14 is opened, the material contained in the chute 17 continuing to feed the mill while the material from the storage compartment of the chamber 4 fills the chute 16, which is set in vibration by means of the vibrator 20, so that the mill does not experience any discontinuity of feed. When the chamber 4 has started feeding, vibrator 21 is deenergized and the grinding operation proceeds on the granulated material from the chamber 4. Feeding of the granulated product by the pneumatic circuit 3 is then resumed and, by opening the valve 8, the granulated product is sent into the storage compartment of the chamber 5 which is filled in part of the time necessary to empty the chamber 4.

After filling, the chamber 5 is completely isolated from the feeding circuit 3 and from the vibrating chute 17 by the valves 8 and 15, the operation of the feeding circuit 3 is discontinued and the inside of the storage compartment of the chamber 5 is evacuated by means of the pump 12.

When the upper level of the product contained in the chamber 4 has nearly reached the lower part of this chamber, the chamber 5 is ready for a new feeding operation of the mill, and is connected to chute 17 by a sequence of operations identical to those carried out for feeding from chamber 4.

The ground material accumulating in the lower part of the evacuated enclosure 2 flows through the branch 22 into the chutes 24 and 25, which are kept under vacuum by communication with the enclosure 2, and is conveyed into that one of the two discharging chambers which is in operation, for example into the chamber 30, by means of the chute 24 which is vibrated by the vibrator 27. The valve 32 is open and the valve 33 is closed. Since the valve 38 is closed, the ground material fills the storage compartment of the chamber 30 which has previously been evacuated by the pump 35. The ground material therefore discharges continuously from the enclosure under vacuum 2 into the discharging chamber 30.

While the chamber 30 is being filled, the chamber 31, previously filled with ground material, is emptied by means of the discharge circuit 40. In order to do this, the valve 39 is opened and the chamber 31 is connected to the pneumatic discharging circuit 40 for transport of the pulverulent material into a storage installation.

The emptying operation of the chamber 31 is carried out in less time than it takes to fill the storage compartment of the chamber 30. When the storage compartment of the chamber 31 has been completely emptied, the operation being carried out over a length of time which is e.g. approximately equal to half the time taken to fill the chamber 30, the valve 39 is closed and the operation of the pneumatic discharging circuit 40 is discontinued. The storage compartment of the chamber 31 is then evacuated by operation of the pump 36, and the chamber 31 is again ready to receive the pulverulent material discharged through the branch 22 and the chute 25.

When the storage compartment of the chamber 30 has been filled, the valve 33 is opened and the vibrating chute 25 is vibrated by the vibrator 28. The ground material then flows into the storage compartment of the chamber 31. It is then possible to empty the chamber 30 by closing the valve 32, opening the valve 38 and setting the pneumatic discharging circuit 40 in operation, the ground material meanwhile discharging through the chute 25 and into the chamber 31. The remaining operations consist of emptying the chamber 30, then evacuating it after closing the valve 38, and discontinuing the use of the pneumatic discharging circuit 40, the role of the two chambers being reversed.

It is understood that the operations described above can continue indefinitely, the materials passing continuously through the evacuated enclosure 2 and the mill.

The feeding and discharging device which has been described thus makes it possible for the mill to operate continuously.

In order to avoid clogging the vacuum-generating installations of the various chambers and of the enclosure, the suction systems are preceded by filters which retain the fine particles of pulverulent material which could be entrained with the evacuated gases.

In a vertical system where the material flows principally by gravity, such as the system which has now been described, the horizontal vibrating chutes 16, 17 and 24, 25 make it possible to save space on the height, which is particularly valuable in the case of high capacity industrial installations which require very high chambers and a very high enclosure.

On the other hand, the lateral arrangement of the chambers above and below the enclosure 2 makes it possible to remove the central part of the enclosure, which is particularly useful for carrying out dismantling and maintenance operations on the mill. Finally, the vibrating chutes are preferably equipped with magnetic vibrators which are situated entirely on the outside of the chutes which consist of leaktight tubes, this arrangement having the advantage of not requiring any mechanical component to be placed under vacuum.

The invention is not intended to be limited to the embodiment which has now been described, but comprises all variants, and points of detail can be modified without thereby going outside the scope of the invention.

Thus, it is possible to design a feeding and discharging apparatus which comprises more than two feeding chambers and/or more than two discharging chambers, each of these chambers being connected alternately to the pneumatic feeding or discharging circuit and to the chutes and the enclosure.

It is also possible to design an apparatus in which the chambers are connected to the enclosure by means of inclined chutes, if the vertical space taken up by the installation is not critical. In certain cases, it will not be necessary to adopt a lateral position for the chambers to make it possible for the central part of the enclosure under vacuum to be removed, and in this case, it will be possible for the junction between the chambers and the enclosure to consist of a simple branch.

It is also possible to design an arrangement of the various components which is different from the vertical arrangement which has now been described, the materials being transported not by gravity but by means of transporting devices.

It is also possible to use, in association with the chambers, conventional devices which are generally associated with the hoppers in order to facilitate the flow of the products, in the form of grains or powder, which flow into these hoppers.

Finally, the device according to the invention can be used not only in association with a vacuum mill but also with any installation operating under subatmospheric pressure for the treatment of materials, in the form of grains or powder.

There is thus provided a feeding and discharging apparatus for an installation under subatmospheric pressure, which makes it possible to continuously pass a solid product, in the form of grains or powder, through the enclosure under vacuum which houses the installation, without it being necessary to break the vacuum in the enclosure.

What is claimed is:

1. A feeding and discharging apparatus for continuously feeding particulate material to and continuously discharging material from a chamber of a treatment apparatus under subatmospheric pressure, said apparatus comprising: a feeding device for feeding particulate material; at least two feeding chambers each having an inlet and an outlet; means connecting said inlet of each said feeding chamber to said feeding device; means for connecting said outlet of each said feeding chamber to said chamber of said treatment apparatus; valve means for closing said inlets and said outlets of said feeding chambers; a discharging device for discharging particulate materials; at least two discharging chambers each having an inlet and an outlet; means for connecting said inlet of each said discharging chamber to said chamber of said treatment apparatus; means connecting said outlet of each discharging chamber to said discharging device; valve means for closing said respective inlets and said outlets of said discharging chambers; each of said feeding chambers and said discharging chambers comprising a compartment for storing material; and means for producing a subatmospheric pressure in each said compartment.

2. Apparatus according to claim 1, wherein: said feeding chambers are situated above said chamber of said treatment apparatus and laterally relative thereto, each said connecting means for connecting said outlet of a respective said feeding chamber to said chamber of said treatment apparatus and comprises a horizontal vibratable chute connected to an upper part of said chamber, said discharging chambers are situated below said chamber of said treatment apparatus and laterally relative thereto and each of said connecting means connecting said inlet of a respective said discharging chamber to said chamber and comprising a horizontal vibratable chute connected to a lower part of said chamber.

3. Apparatus according to claim 2, wherein said vibratable chutes comprise leaktight tubes having magnetic vibrators.

4. Apparatus according to claim 1, wherein said chamber is a vacuum jet mill.

* * * * *